United States Patent
Low et al.

(10) Patent No.: US 9,417,773 B2
(45) Date of Patent: Aug. 16, 2016

(54) MOBILE APPLICATION PRE-FETCHING USING A STATE FRAMEWORK

(71) Applicant: Yahoo! Inc., Sunnyvale, CA (US)

(72) Inventors: Daryl Low, San Jose, CA (US); Brian Tunning, Campbell, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/516,401

(22) Filed: Oct. 16, 2014

(65) Prior Publication Data

US 2016/0110061 A1    Apr. 21, 2016

(51) Int. Cl.
*G06F 3/0484* (2013.01)
*G06F 3/0481* (2013.01)
*G06N 5/02* (2006.01)

(52) U.S. Cl.
CPC ........ *G06F 3/04842* (2013.01); *G06F 3/04817* (2013.01); *G06N 5/02* (2013.01)

(58) Field of Classification Search
CPC .... G06F 3/04842; G06F 3/04817; G06N 5/02
See application file for complete search history.

(56) References Cited

U.S. PATENT DOCUMENTS

| 2010/0235329 | A1* | 9/2010 | Koren | G06F 17/30902 707/687 |
| 2011/0320804 | A1* | 12/2011 | Chan | G06F 12/0862 713/150 |
| 2014/0373032 | A1* | 12/2014 | Merry | G06F 9/54 719/328 |

OTHER PUBLICATIONS

VanderWiel, Steven P. et al., "Data Prefetch Mechanisms," ACM Computing Surveys Journal (CSUR), vol. 32, Issue 2, pp. 174-199, Jun. 2000.

* cited by examiner

*Primary Examiner* — Kristy A Haupt
(74) *Attorney, Agent, or Firm* — Weaver Austin Villeneuve & Sampson LLP (57) ABSTRACT

In one embodiment, a current state of an application that is executing may be identified. A plurality of next possible states to which a user can navigate from the current state may be ascertained. A history of user behavior of one or more users may be determined. Data pertaining to at least one of the plurality of next possible states may be fetched based, at least in part, upon the history of user behavior of the one or more users.

20 Claims, 9 Drawing Sheets

MOBILE APPLICATION PRE-FETCHING USING A STATE FRAMEWORK

BACKGROUND OF THE INVENTION

The disclosed embodiments relate generally to computer-implemented methods and apparatus for executing applications.

When a user executes an application, the application often provides the user with options from which the user may select. Upon receipt of the user's selection, the application then processes the user selection, which may include retrieving content pertinent to the user selection. During the retrieval of the content, the user is typically presented with a visual indicator to indicate the application is loading content pertaining to the user selection. The user must then wait until the application completes the loading process.

SUMMARY OF THE INVENTION

The disclosed embodiments enable data to be pre-fetched during the execution of an application. The data may include various forms of content including, but not limited to, text, images, and/or web pages.

In one embodiment, a current state of an application that is executing may be identified. A plurality of next possible states to which a user can navigate from the current state may be ascertained. A history of user behavior of one or more users may be determined. Data pertaining to at least one of the plurality of next possible states may be fetched based, at least in part, upon the history of user behavior of the one or more users.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. Often, users rely on the Internet to search for information of interest to them. In addition, many applications facilitate the retrieval of information.

Information is often presented to a user in the form of a document. A document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

An application that is executing may be described as being in a current state. For example, the current state may include the display of a home page of the application, or other web page or graphical user interface (GUI). From the current state, there may be a plurality of next possible states (e.g., GUIs) from which the user may select. For example, the user may choose to view "world news," "sports," "fashion," etc.

Typically, pre-fetching is performed via static configuration of the data that is to be pre-fetched at various points during execution of a given application. Such pre-fetching does not take into account observed user behavior. As a result, pre-fetching typically cannot be customized dynamically for a particular user or category of users. Since pre-fetching is generally customized on a per-application and per-GUI basis, significant coding efforts are typically required for each application.

Some applications have numerous possible states. Since coding for such applications can be particularly time-consuming, customization of pre-fetching on a per-application basis can be time-intensive.

In accordance with various embodiments, data that is to be pre-fetched may be dynamically ascertained, as appropriate for the current application state and next application state(s) that a user is likely to access from all next possible application states. Since past user behavior is taken into account, the disclosed embodiments support a general solution for performing pre-fetching of data. As a result, code that performs such pre-fetching need not be customized for each application or GUI.

The disclosed embodiments enable pre-fetching of data to be performed prior to the receipt of an indication from a user of the next application state the user would like to access. Since the data has been pre-fetched, when the user selects one of the next possible application states, the data has already been retrieved and may be presented to the user in a timely fashion. For example, when the user selects "sports," the data pertaining to sports may have already been pre-fetched and be presented via the corresponding GUI, eliminating or reducing the presentation of loading indicators and idle time typically experienced by users.

Pre-fetching may be facilitated by predicting the data that the user is most likely to access. This may be accomplished by predicting those states of the plurality of next possible states that the user is most likely to select. Predicting the states that the user is most likely to select may be accomplished based, at least in part, upon the analysis of a history of user behavior (e.g., Internet activities) of one or more users. The history of user behavior may pertain to one or more applications, which may or may not include the application being executed. Furthermore, since the user may be new to the system, the one or more users may or may not include the user accessing the application.

In some embodiments, the prediction of states that the user is most likely to access may be further based on additional factors, such as demographic information (e.g., age and/or gender) pertaining to the users and/or a geographical location of the users.

While various examples disclosed herein refer to the presentation of GUIs, it is important to note that these examples are merely illustrative. Accordingly, the disclosed embodiments may enable data pertaining to states of various types to be identified so that corresponding data may be pre-fetched.

Example System

Figure 1:
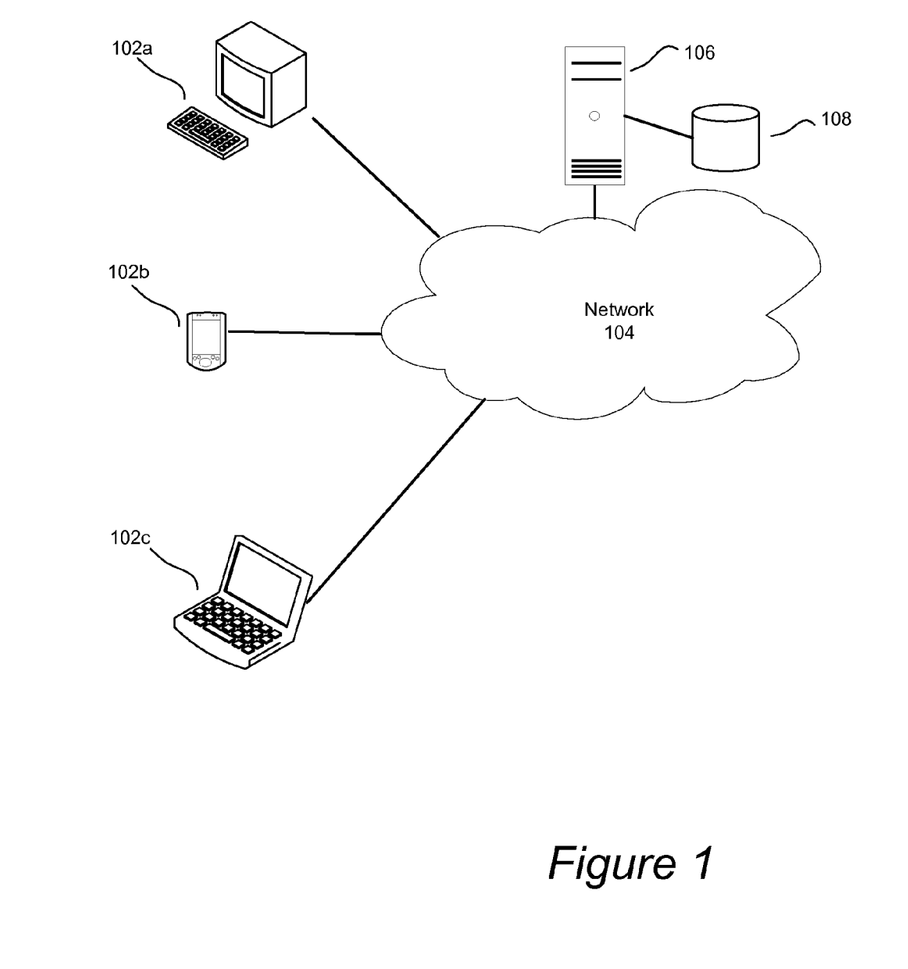
FIG. 1 is a diagram illustrating an example system in which embodiments of the invention may be implemented.

FIG. 1 is a diagram illustrating an example system in which various embodiments may be implemented. As shown in FIG. 1, the system may include one or more servers 102 associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, the server(s) 102 may include a web server, search server, and/or content server.

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

A plurality of clients 106, 108, 110 may access a web service on a web server via a network 104. The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

In accordance with various embodiments, any of the clients 106, 108, 110 may access an application, which may be installed on a server, via the network 104. In addition, any of the clients 106, 108, 110 may access an application installed on the clients 106, 108, 110. An example client device will be described in further detail below.

The disclosed embodiments enable an application to perform pre-fetching of data during execution of the application as a user interacts with the application. The data that is pre-fetched may include Internet content such as a web page. In some embodiments, the data may include an advertisement or offer pertaining to a product or service. An advertisement or offer may include text, one or more images, video, and/or audio. An advertisement may also include one or more hypertext links, enabling a user to proceed with the purchase of a particular product or service via the Internet.

The data (or portion thereof) that is pre-fetched may be presented within a web page. Alternatively, the data or portion thereof may be presented external to a web page. For example, the data may be presented via a toolbar or another segment of a display that does not block the web page.

Embodiments disclosed herein may be implemented via the server(s) 102 and/or the clients 106, 108, 110. For example, various features may be implemented via a web browser and/or application on the clients 106, 108, 110. The disclosed embodiments may be implemented via software and/or hardware.

Pre-fetching may be performed further based upon a browsing context. The browsing context may include geographic information such as a location from which the user is browsing. In addition, the browsing context may include or be derived from information from a user profile.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

Such user profiles may further include information pertaining to the use of applications by the users. Such information may be application-independent or application specific. More particularly, a user profile may indicate preferred or commonly selected application states of a user and/or a preferred or commonly selected order of the application states.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user, application states that have been selected, and/or a preferred or typical order of such application state selection by the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

In accordance with various embodiments, data may be pre-fetched to provide to a user of an application. More particularly, user behavior may be predicted, and data may be pre-fetched based, at least in part, upon the predicted user behavior. The user behavior may be predicted for one or more users based, at least in part, upon past user behavior. The past user behavior may be ascertained based, at least in part, upon user profiles associated with the one or more users. The users may include the user currently accessing the application, other individuals who have accessed the application, and/or other individuals who have accessed other applications. Pre-fetching may be performed based, at least in part, upon the predicted user behavior.

The disclosed embodiments may be implemented by an application that is executing and/or other applications. Thus, the application and/or other applications may be able to dynamically identify the application's current state and next application state(s) that are likely to be selected by a user, enabling the application or other applications to pre-fetch data that is likely to be requested.

Figure 2:
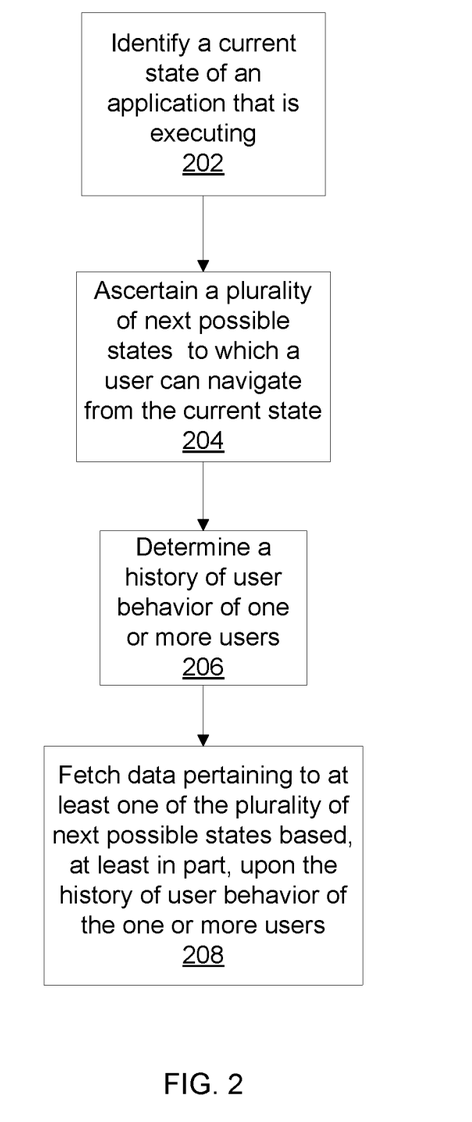
FIG. 2 is a process flow diagram illustrating an example method of pre-fetching data in accordance with various embodiments.

FIG. 2 is a process flow diagram illustrating an example method of performing pre-fetching in accordance with various embodiments. A current state of an application that is executing may be identified at 202. More particularly, the current state of the application that is executing may be identified when the application moves to the current state. For example, the current state of the application may be identified in response to a user selection of the current state of the application.

The current state of the application may be identified by the application and/or another application. In some embodiments, the current state of the application may be provided for use by other applications. For example, the current state of the application may be posted or transmitted as a notification via the application or another component.

In accordance with various embodiments, the current state of the application may include a graphical user interface. Similarly, the plurality of next possible states may include a plurality of next possible graphical user interfaces. Thus, the identification of the current state of the application may include identifying a graphical user interface that is currently being displayed.

A plurality of next possible states to which a user can navigate from the current state may be ascertained at 204. For example, a plurality of next possible graphical user interfaces may be ascertained.

The plurality of next possible states may be ascertained by the application and/or another application. In some embodiments, the plurality of next possible states may be provided for use by other applications. For example, the plurality of next possible states may be posted or transmitted as a notification via the application or another component.

The current state (e.g., the current graphical user interface) may have metadata associated therewith that identifies the plurality of next possible states. Therefore, it is possible to ascertain the plurality of next possible states to which a user can navigate from the current state from the metadata associated with the current state (e.g., the current graphical user interface).

In accordance with various embodiments, the plurality of next possible states may be ascertained from a tree data structure. More particularly, a tree data structure may be generated, where each node in the tree data structure identifies a corresponding state. The tree data structure may be generated after the current state of the application has been identified. Alternatively, the tree data structure may be generated a single time upon initiation of execution of the application such that the tree data structure represents all possible states during execution of the application. An example state tree will be described in further detail below with reference to FIGS. 4A and 4B.

A history of user behavior of one or more users may be determined at 206. The history of user behavior may be determined by the application and/or other applications. The one or more users may include the user, or may not include the user. In addition, the history of user behavior may pertain to one or more applications, which may or may not include the application that is executing. Thus, the disclosed embodiments may be applicable to a variety of applications without being customized for the application that is executing.

The history of user behavior of the one or more users may indicate those states that the users typically select. In addition, the history of user behavior of the one or more users may indicate the order in which the states or portion thereof are typically selected by the users.

Data pertaining to at least one of the plurality of next possible states may be fetched at 208 based, at least in part, upon the history of user behavior of the one or more users. Such "pre-fetching" may be performed by the application and/or other applications (e.g., a data fetch or refresh component). More particularly, the data pertaining to at least one of the plurality of next possible states may be fetched prior to receiving an indication of a selection of one of the plurality of next possible states from the user. For example, the data pertaining to at least one of the plurality of next possible states may be fetched in response to a user selection of the current state of the application Future user behavior of the one or more users may be predicted based, at least in part, upon the history of user behavior of the one or more users. For example, the predicted future user behavior may indicate at least one of the plurality of next possible states that is likely to be selected by the users.

In accordance with various embodiments, predicting future user behavior may include ascertaining, for each of the plurality of next possible states, a probability that the one or more users will select the corresponding one of the plurality of next possible states from the current state, where the probability is ascertained based, at least in part, upon the history of user behavior of the one or more users. In this manner, it is possible to identify at least one of the plurality of next possible application states that the one or more users are most likely to select. Thus, the data pertaining to the at least one of the plurality of next possible states may be fetched based at least in part, upon the probability, for each of the plurality of next possible states, that the one or more users will select the corresponding one of the plurality of next possible states from the current state.

In some embodiments, a usage pattern may be determined based, at least in part, upon the history of user behavior of the one or more users. The data pertaining to at least one of the plurality of next possible states may be fetched based, at least in part, upon the usage pattern. For example, the usage pattern may indicate a common or typical usage pattern of the users. The usage pattern may indicate a common or typical set of states that are selected, as well as the order in which the set of states are selected by the users.

Since fetching of data may be initiated prior to receiving an indication of a selection of a next state by the user, such pre-fetching may be initiated for next states that the user may never select. Thus, when the user chooses to go to a next state (or a previous state by going back to a previous screen), the pre-fetching of data for next states that the user has not selected may automatically cease. In other words, pre-fetching of data (or a portion thereof) being performed for a screen that is no longer the current screen may be automatically cancelled.

Figure 3A:
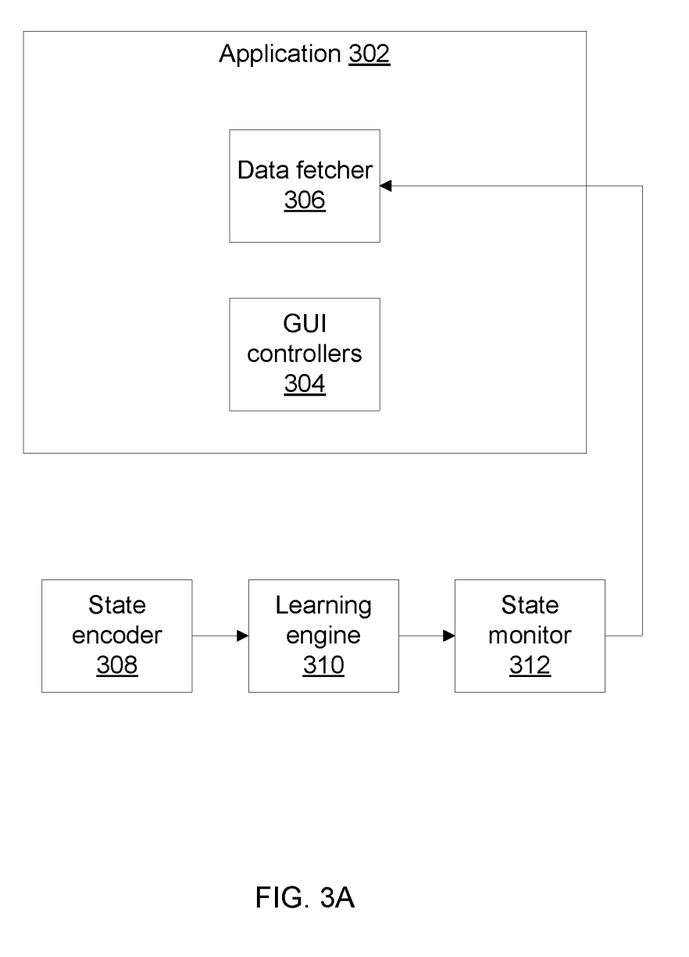
FIG. 3A is a diagram illustrating an example system in which the disclosed embodiments may be implemented.

FIG. 3A is a diagram illustrating an example system in which the disclosed embodiments may be implemented. As shown in FIG. 3A, an application 302 may include a plurality of GUI controllers 304 and a Data fetcher 306. Each of the view controllers 304 may be configured to generate a corresponding GUI (e.g., screen view). For example, an articles list view controller may generate an article list screen view. The Data fetcher 306 may pre-fetch data for one or more possible next states. More particularly, the Data fetcher 306 may ascertain or be notified when a user moves from a state to a new state, moves from a new state, and/or those next states that are likely to be selected. The Data fetcher 306 may fetch/update data pertinent to the new state (e.g., the next states that are likely to be selected), as appropriate.

A State encoder 308 may be configured to traverse a state tree corresponding to the plurality of GUI controllers 304 and determine next possible states that may be navigated to from the current state. An example state tree will be described in further detail below with reference to FIGS. 4A and 4B. A Learning engine 310 may predict, based upon user behavior of one or more users, at least one of the next possible states that is most likely to be selected. A State monitor 312 may monitor the current state and/or likely next possible states, and notify the Data fetcher 306, as appropriate. For example, the State monitor 312 may notify the Data fetcher 306 that the user moved from a particular state, notify the Data fetcher 306 that the user moved to a particular state, and/or notify the Data fetcher 306 of the likely next possible state(s) to which the user may move.

Figure 3B:
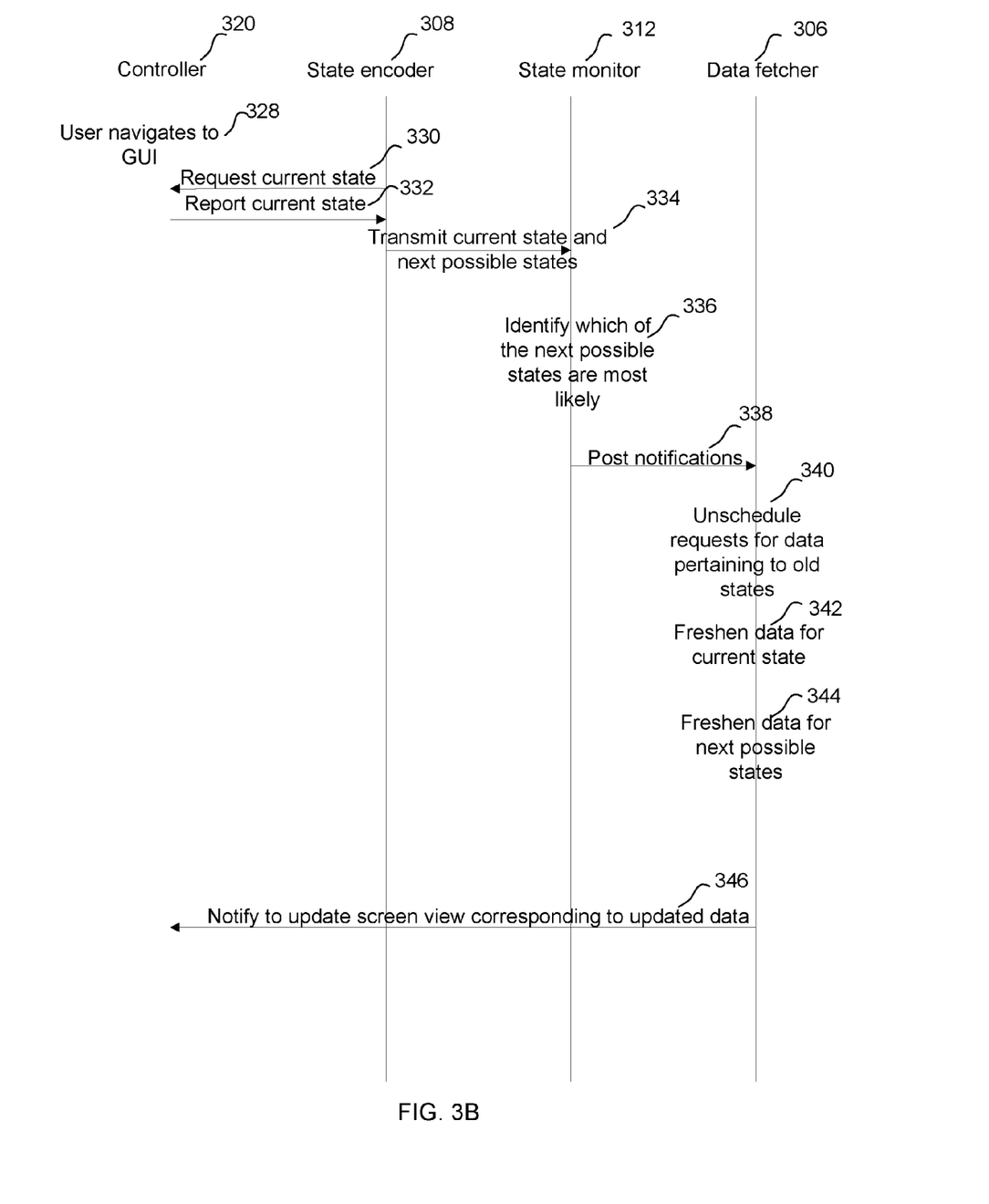
FIG. 3B is a transaction flow diagram illustrating an example method of processing a state change in accordance with various embodiments.

FIG. 3B is a transaction flow diagram illustrating an example method of performing data pre-fetching in accordance with various embodiments. Steps performed by a Controller, State encoder, State monitor, and Data fetcher will be shown and described with reference to corresponding vertical lines 320, 308, 312, 306. A user may navigate to a GUI at 328. The State encoder may request the current state at 330 from the application. The Controller may then report the current state at 332 to the State encoder.

The State encoder may traverse the state tree to determine the next possible states that may be navigated to from the current state. The State encoder may report the current state and next possible states to the State monitor at 334. The State monitor may communicate with the Learning engine to identify which of the next possible states are most likely at 336. The State monitor may post notifications at 338 so that the Data fetcher is aware of the next possible states that are most likely to be selected.

The Data fetcher may unschedule data requests for data pertaining to old states (e.g., next possible states associated with a prior state) at 340. Data for the current state may be freshened at 342. For example, data associated with the current state that was pre-fetched may be fetched again to ensure that the data is current (e.g., where a minimum threshold period of time has elapsed). Data for at least one of the next possible states may be freshened at 344. For example, data associated with at least one of the next possible states may be fetched. Objects for which data has been fetched may be marked as changed. The Controller may be notified at 346 to update the screen view to reflect the updated data.

The current state (e.g., the current graphical user interface) may have metadata associated therewith that identifies the plurality of next possible states. Therefore, it is possible to ascertain the plurality of next possible states to which a user can navigate from the current state from the metadata associated with the current state (e.g., the current graphical user interface). This may be accomplished via a state tree, as will be described in further detail below with reference to FIGS. 4A-4B.

Figure 4A:
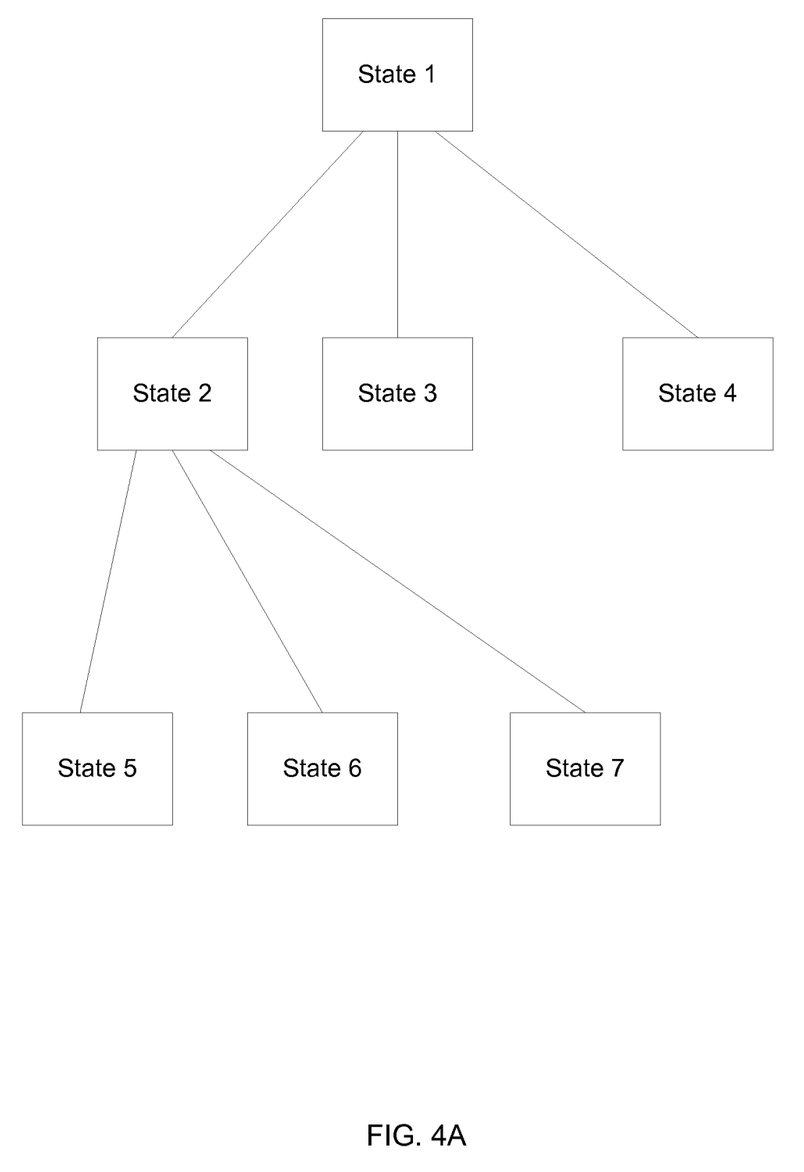
FIG. 4A is a diagram illustrating an example state tree that may be implemented in accordance with various embodiments.

FIG. 4A is an example state tree that may be implemented in accordance with various embodiments. As shown in this example, a state tree may be implemented as a tree data structure, where each node in the tree data structure identifies a corresponding state. The tree data structure may be generated a single time upon initiation of execution of the application such that the tree data structure represents all possible states during execution of the application. Alternatively, the tree data structure may be generated after the current state of the application has been identified. Given a current state, it is possible to ascertain a plurality of next possible states from the state tree.

As shown in this example, when the current state is "State 1," the plurality of next possible states include "State 2," "State 3," and "State 4." Similarly, when the current state is "State 2," the plurality of next possible states include "State 5," "State 6," and "State 7."

Each different state in the state tree may correspond to a corresponding GUI. Each GUI may include a view controller or screen that is to be presented to a user in association with corresponding data that is retrieved (e.g., pre-fetched). Each such view controller or screen may include or be associated with a set of metadata. For example, the metadata may include information such as a screen name that may be used to identify the current state. As another example, the metadata may further identify a plurality of next possible states (e.g., controller classes or screen names) that can be directly accessed from the screen. In this manner, a view controller or screen may "advertise" the plurality of next possible states to which a user may navigate from the current state.

Figure 4B:
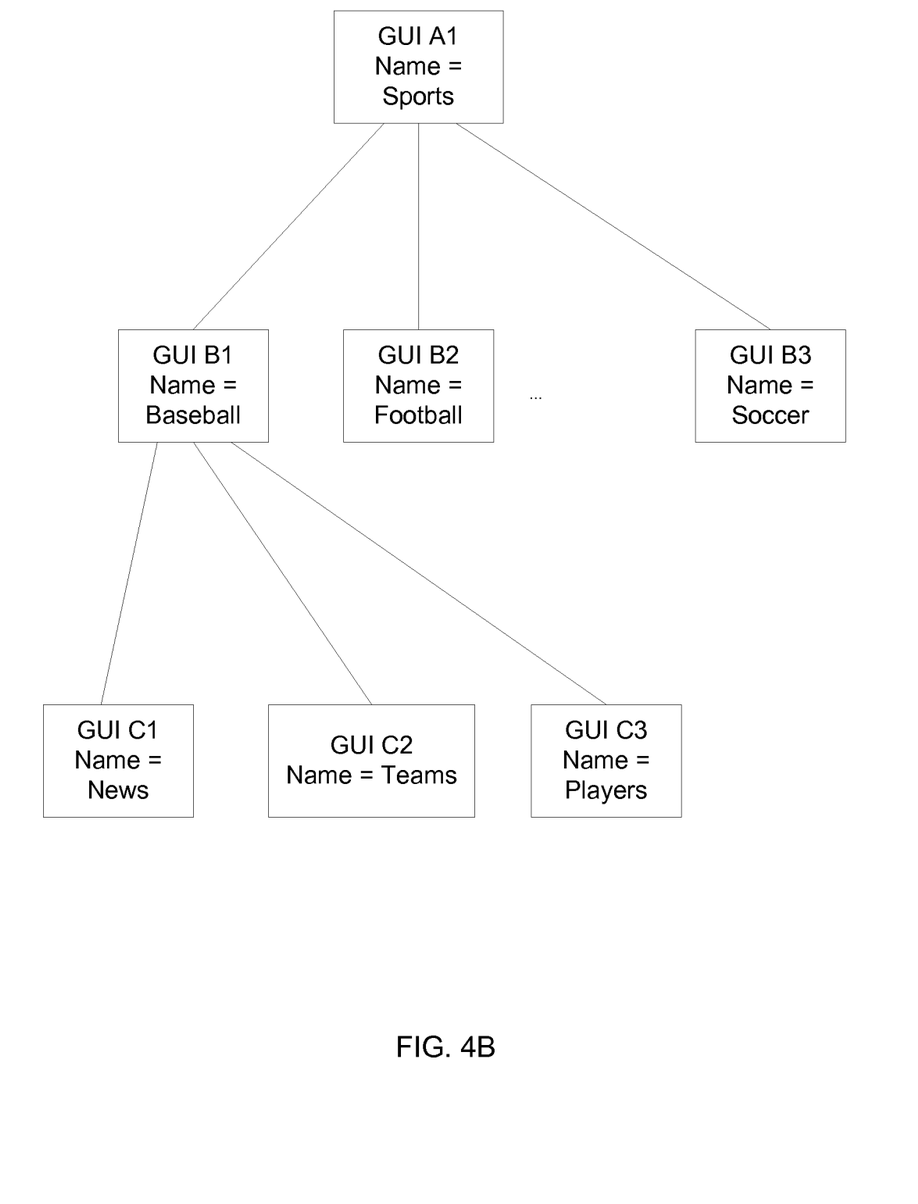
FIG. 4B is a diagram illustrating another example state tree that may be implemented in accordance with various embodiments.

FIG. 4B is a diagram illustrating another example state tree that may be implemented in accordance with various embodiments. As shown in this example, each node in the state tree may identify a corresponding GUI. As set forth above, each GUI may include a screen that is to be presented to a user in association with corresponding data that is retrieved (e.g., pre-fetched). Each such screen may include or be associated with a set of metadata. For example, the metadata may include information such as a screen name that may be used to identify the current GUI. More particularly, the screen name may be represented as a (key, value) pair. As another example, the metadata may further identify a plurality of next possible GUIs (e.g., screen names) that can be directly accessed from the current GUI. In this manner, a screen may "advertise" the plurality of next possible GUIs that may be reached from the current GUI.

The state tree may be generated a single time upon initiation of execution of the application such that the state tree represents all possible GUIs during execution of the application. Alternatively, the state tree may be generated after the current GUI of the application has been identified. Given a current GUI, it is possible to ascertain a plurality of next possible GUIs from the state tree.

As shown in this example, when the current GUI is "Sports," the plurality of next possible GUIs include screens entitled "Baseball," "Football," and "Soccer." Similarly, when the current GUI is "Baseball," the plurality of next possible GUIs include screens entitled "News," "Teams," and "Players."

The screens may include the metadata in the form of a description language. Since a state tree may be generated and navigated using this metadata, data pre-fetching is not tied to a specific GUI or application. As a result, the disclosed embodiments may perform pre-fetching in a generalized manner for any application or GUI to optimize data loading for any application.

Information indicating those states that have been navigated may be recorded during execution of an application. The recorded information indicating those states that have been navigated and the order in which they have been navigated may be used to ascertain a user's common usage pattern and/or generate a user's favorite states. Moreover, such recorded information may be used to automatically generate analytics reports. Thus, the state of an application when the application crashed may be easily identified from such an analytics report.

Since the GUIs of a given application may be marked with a current state and next possible states, a tool may be configured to automatically navigate an application to all possible states or navigate randomly through the states for a period of time. In this manner, the disclosed embodiments may be applied to implement a test script for performing automated testing of applications.

The disclosed embodiments may be implemented via one or more devices. By performing pre-fetching of data during idle time, network resources may be utilized in a more efficient manner.

In accordance with various embodiments, the application may be executed on a mobile device such as a cellular phone, a smart phone, a handheld computer, a laptop computer, or a tablet computer. Performing frequent, small data requests may negatively impact a mobile device's battery life. Through the disclosed embodiments, by performing pre-fetching of data during idle periods, the battery life of a mobile device may be extended.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
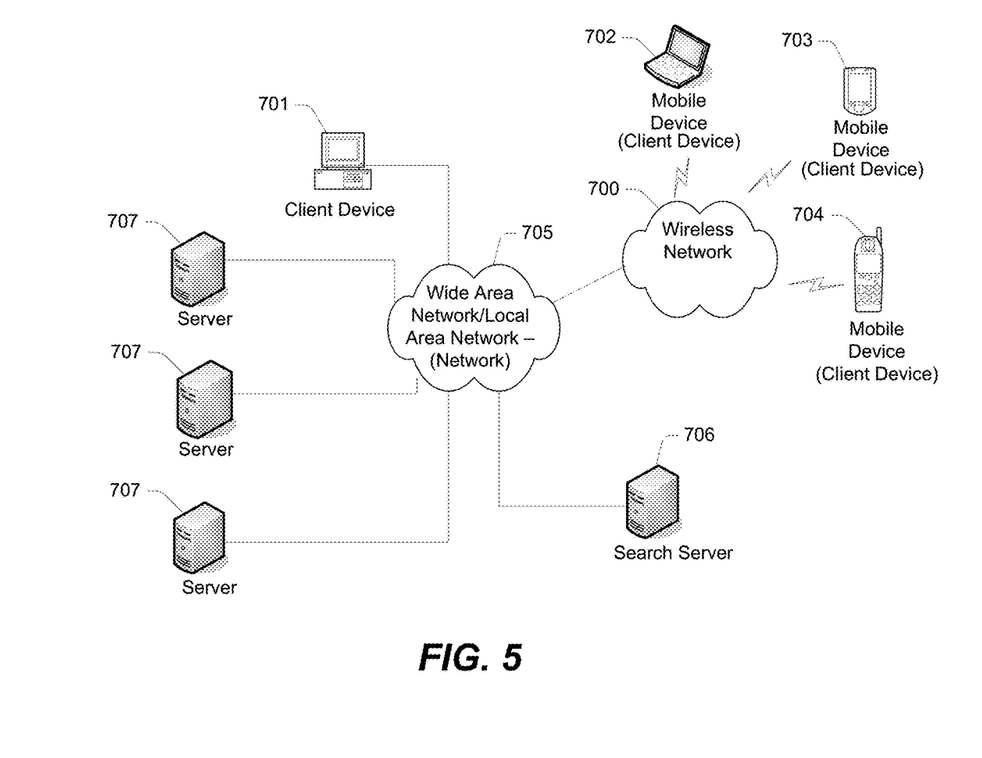
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
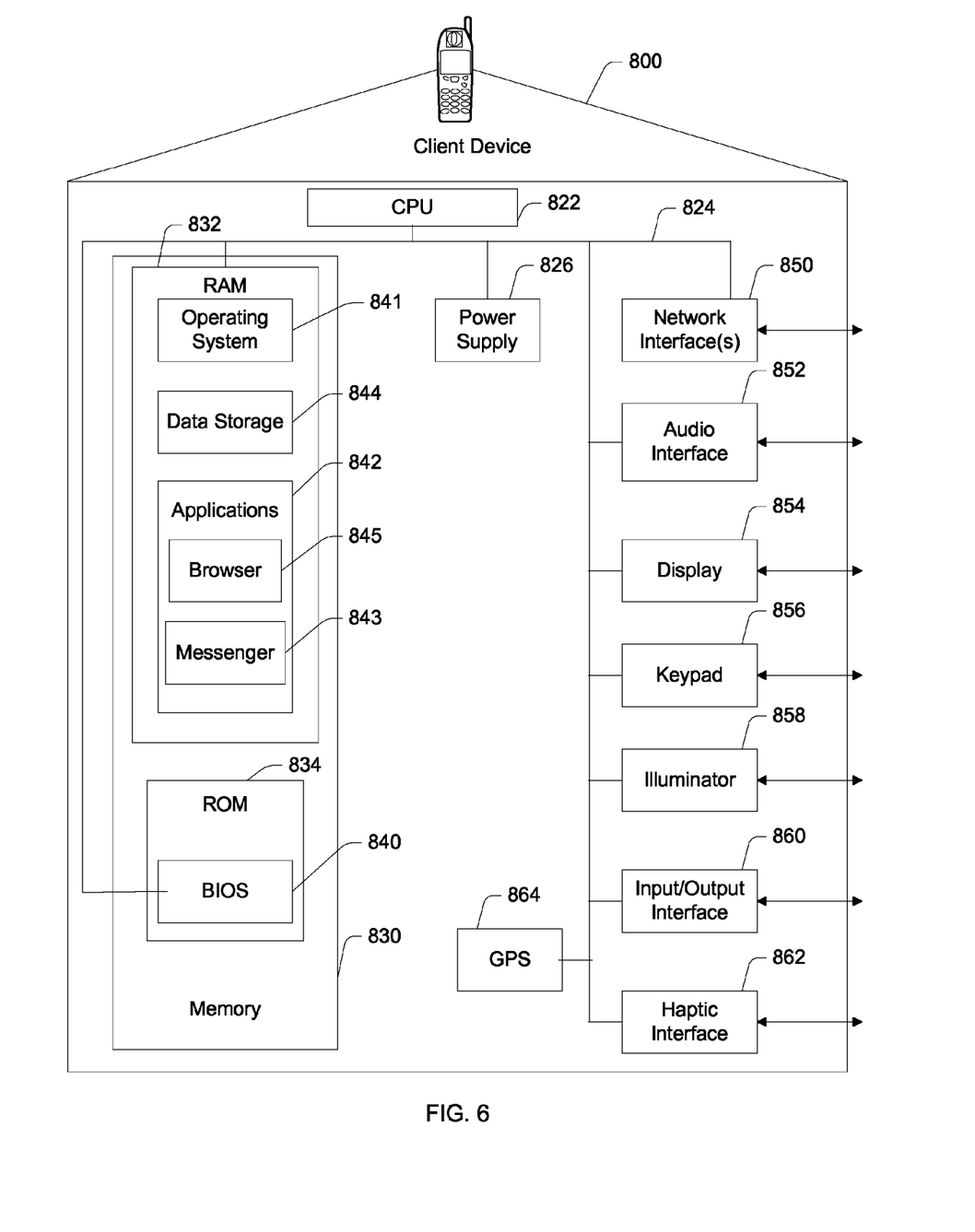
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 7:
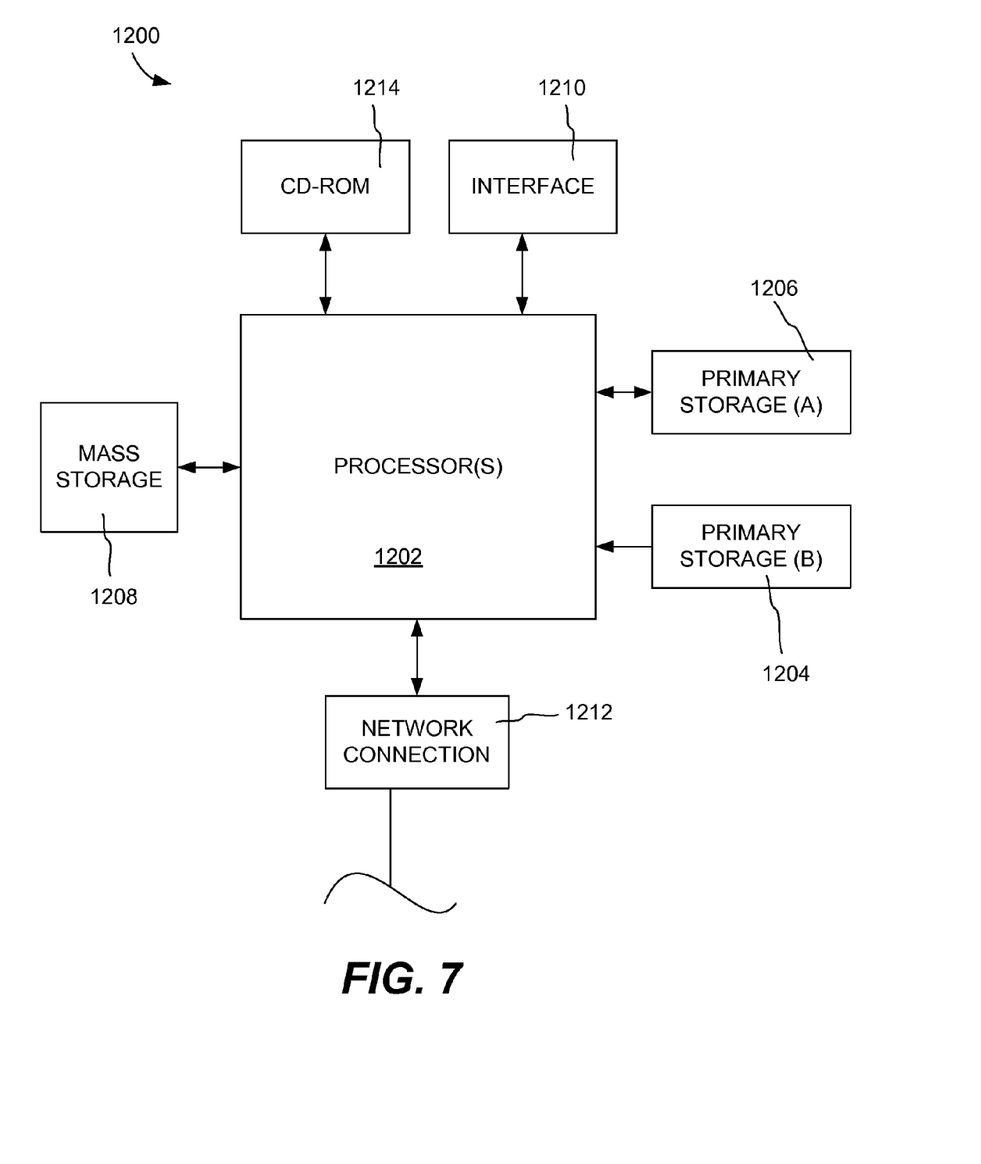
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    identifying, by a processor, a current state of an application that is executing;
    ascertaining a plurality of next possible states of the application to which a user can navigate from the current state;
    determining a history of user behavior of one or more users; and
    fetching data pertaining to at least one of the plurality of next possible states based, at least in part, upon the history of user behavior of the one or more users.

2. The method as recited in claim 1, wherein fetching data is performed prior to receiving an indication of a selection of one of the plurality of next possible states from the user, and wherein identifying the current state of the application that is executing is performed when the application moves to the current state.

3. The method as recited in claim 1, wherein identifying a current state of an application that is executing comprises identifying a graphical user interface that is currently being displayed, and wherein the plurality of next possible states comprise a plurality of next possible graphical user interfaces.

4. The method as recited in claim 1, further comprising:
    for each of the plurality of next possible states, determining a probability that the user will select the corresponding one of the plurality of next possible states from the current state based, at least in part, upon the history of user behavior of the one or more users;
    wherein fetching data is performed based at least in part, upon the probability, for each of the plurality of next possible states, that the user will select the corresponding one of the plurality of next possible states from the current state.

5. The method as recited in claim 1, wherein the one or more users comprise the user.

6. The method as recited in claim 1, wherein the history of user behavior of the one or more users pertains to one or more applications including the application.

7. The method as recited in claim 1, wherein the history of user behavior of the one or more users pertains to one or more applications that do not include the application.

8. The method as recited in claim 1, wherein ascertaining a plurality of next possible states to which a user can navigate from the current state comprises:
    generating a tree data structure;
    wherein each node in the tree data structure identifies a corresponding state.

9. An apparatus, comprising:
    a processor; and
    a memory, at least one of the processor or the memory being configured to:
        identify a current state of an application that is executing;
        ascertain a plurality of next possible states of the application to which a user can navigate from the current state;
        determine a history of user behavior of one or more users; and
        fetch data pertaining to at least one of the plurality of next possible states based, at least in part, upon the history of user behavior of the one or more users.

10. The apparatus as recited in claim 9, at least one of the processor or the memory being further configured to:

determine a usage pattern based, at least in part, upon the history of user behavior of the one or more users; and fetch data pertaining to at least one of the plurality of next possible states based, at least in part, upon the usage pattern.

11. The apparatus as recited in claim 9, wherein the apparatus is a mobile device.

12. The apparatus as recited in claim 9, wherein the current state comprises a graphical user interface and the plurality of next possible states comprise a plurality of graphical user interfaces.

13. The apparatus as recited in claim 12, wherein the graphical user interface has metadata associated therewith that identifies the plurality of next possible states, wherein ascertaining the plurality of next possible states to which a user can navigate from the current state comprises ascertaining the plurality of next possible states from the metadata associated with the graphical user interface.

14. A non-transitory computer-readable storage medium, comprising:

instructions for identifying a current state of an application that is executing;

instructions for ascertaining a plurality of next possible states of the application to which a user can navigate from the current state;

instructions for determining a history of user behavior of one or more users; and instructions for fetching data pertaining to at least one of the plurality of next possible states based, at least in part, upon the history of user behavior of the one or more users.

15. The non-transitory computer-readable storage medium as recited in claim 14, wherein fetching data is performed prior to receiving an indication of a selection of one of the plurality of next possible states from the user, and wherein identifying the current state of the application that is executing is performed when the application moves to the current state.

16. The non-transitory computer-readable storage medium as recited in claim 14, wherein identifying a current state of an application that is executing comprises identifying a graphical user interface that is currently being displayed, and wherein the plurality of next possible states comprise a plurality of next possible graphical user interfaces.

17. The non-transitory computer-readable storage medium as recited in claim 14, further comprising:

instructions for determining, for each of the plurality of next possible states, a probability that the user will select the corresponding one of the plurality of next possible states from the current state based, at least in part, upon the history of user behavior of the one or more users;

wherein fetching data is performed based at least in part, upon the probability, for each of the plurality of next possible states, that the user will select the corresponding one of the plurality of next possible states from the current state.

18. The non-transitory computer-readable storage medium as recited in claim 14, wherein the history of user behavior of the one or more users pertains to one or more applications including the application.

19. The non-transitory computer-readable storage medium as recited in claim 14, wherein the history of user behavior of the one or more users pertains to one or more applications that do not include the application.

20. The non-transitory computer-readable storage medium as recited in claim 16, wherein the graphical user interface has metadata associated therewith that identifies the plurality of next possible states, wherein ascertaining the plurality of next possible states to which a user can navigate from the current state comprises ascertaining the plurality of next possible states from the metadata associated with the graphical user interface.

* * * * *